United States Patent
Bauerle (10) Patent No.: US 7,991,524 B2
(45) Date of Patent: Aug. 2, 2011

(54) TEMPERATURE SENSOR DIAGNOSTICS

(75) Inventor: Paul A. Bauerle, Fenton, MI (US)

(73) Assignee: GM Global Technology Operations LLC

( * ) Notice: Subject to any disclaimer, the term of this patent is extended or adjusted under 35 U.S.C. 154(b) by 619 days.

(21) Appl. No.: 12/061,223

(22) Filed: Apr. 2, 2008

(65) Prior Publication Data

US 2009/0168832 A1    Jul. 2, 2009

Related U.S. Application Data

(60) Provisional application No. 61/018,574, filed on Jan. 2, 2008.

(51) Int. Cl.
*G01K 15/00*   (2006.01)
(52) U.S. Cl. .......................... 701/29; 701/34; 73/114.34
(58) Field of Classification Search ..................... 701/29, 701/34; 123/479, 41.1, 41.5; 73/114.31–114.34; 374/1, E15.001; 702/99
See application file for complete search history.

(56) References Cited

U.S. PATENT DOCUMENTS

| | | | | |
|---|---|---|---|---|
| 4,274,381 | A * | 6/1981 | Abo | 123/479 |
| 6,091,324 | A * | 7/2000 | Arsenault et al. | 340/449 |
| 6,192,678 | B1 * | 2/2001 | Tachibana | 60/289 |
| 6,302,078 | B1 * | 10/2001 | Davison | 123/41.15 |
| 6,755,078 | B2 * | 6/2004 | Hernandez et al. | 73/114.74 |
| 7,797,927 | B2 * | 9/2010 | Nagaoka et al. | 60/277 |
| 2002/0148416 | A1 * | 10/2002 | Cohen | 123/41.1 |
| 2002/0193921 | A1 * | 12/2002 | Reese et al. | 701/29 |
| 2008/0054835 | A1 * | 3/2008 | Tamaru | 318/634 |

FOREIGN PATENT DOCUMENTS

| | | |
|---|---|---|
| DE | 10120968 A1 | 11/2002 |
| DE | 10329038 B3 | 2/2005 |

\* cited by examiner

*Primary Examiner* — Thomas G Black
*Assistant Examiner* — Marthe Marc Coleman (57) ABSTRACT

A temperature sensor diagnostic system for a vehicle comprises a deviation calculation module, a limits determination module, and a fault diagnostic module. The deviation calculation module calculates a deviation coefficient based on a time constant of a temperature sensor and a period between first and second temperatures measured by the temperature sensor, wherein the second temperature is measured after the first temperature. The limits determination module determines upper and lower temperature limits based on the first temperature and the deviation coefficient. The fault diagnostic module selectively diagnoses a fault in the temperature sensor when the second temperature is one of greater than the upper temperature limit and less than the lower temperature limit.

18 Claims, 5 Drawing Sheets

TEMPERATURE SENSOR DIAGNOSTICS

CROSS-REFERENCE TO RELATED APPLICATIONS

This application claims the benefit of U.S. Provisional Application No. 61/018,574, filed on Jan. 2, 2008. The disclosure of the above application is incorporated herein by reference in its entirety.

FIELD

The present disclosure relates to internal combustion engines and more specifically to temperature sensor diagnostics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
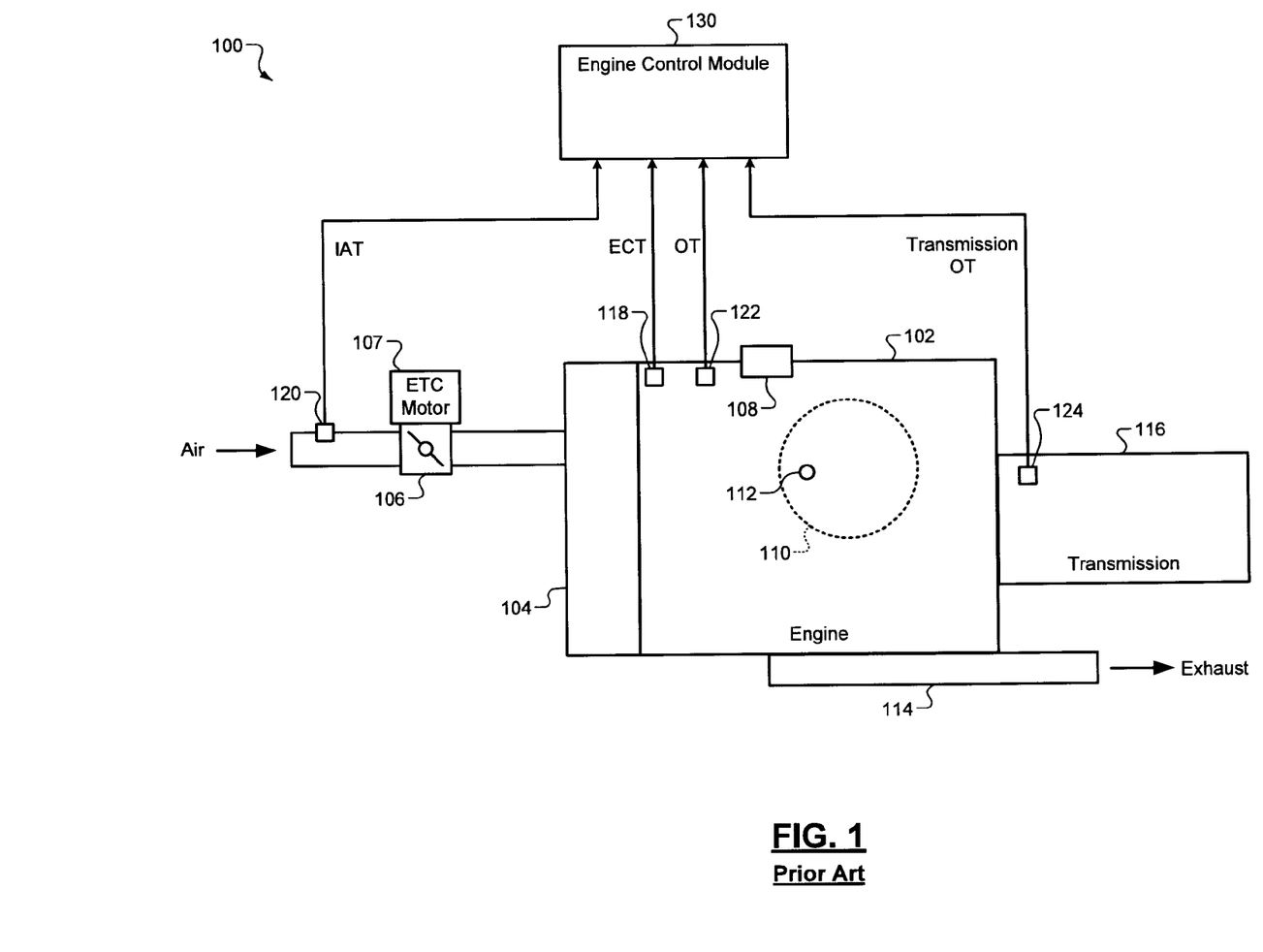
FIG. 1 is a functional block diagram of an engine system according to the prior art.

Referring now to FIG. 1, a functional block diagram of an engine system 100 is presented. An engine 102 produces drive torque for a vehicle. Air is drawn into the engine 102 through an intake manifold 104. A throttle valve 106 varies the volume of air drawn into the intake manifold 104. Opening of the throttle valve 106 is controlled by an electronic throttle control (ETC) motor 107. The air mixes with fuel from one or more fuel injectors 108 to form an air and fuel (A/F) mixture.

The A/F mixture is combusted within one or more cylinders of the engine 102, such as cylinder 110. In various engine systems, such as the engine system 100, combustion is initiated by a spark provided by a spark plug 112. Exhaust resulting from combustion is expelled from the cylinders to an exhaust system 114. Combustion of the A/F mixture produces torque. The engine 102 may transfer torque to a transmission 116, which may transfer torque to one or more wheels of the vehicle.

An engine controller 130 controls torque output by the engine 102 based on temperatures provided by one or more temperature sensors. The temperature sensors each measure a temperature and may be located at various locations throughout the engine system 100. For example only, the engine system 100 may include an engine coolant temperature (ECT) sensor 118, an intake air temperature (IAT) sensor 120, an oil temperature (OT) sensor 122, a transmission oil temperature sensor 124, and/or an ambient air temperature sensor (not shown).

SUMMARY

A temperature sensor diagnostic system for a vehicle comprises a deviation calculation module, a limits determination module, and a fault diagnostic module. The deviation calculation module calculates a deviation coefficient based on a time constant of a temperature sensor and a period between first and second temperatures measured by the temperature sensor, wherein the second temperature is measured after the first temperature. The limits determination module determines upper and lower temperature limits based on the first temperature and the deviation coefficient. The fault diagnostic module selectively diagnoses a fault in the temperature sensor when the second temperature is one of greater than the upper temperature limit and less than the lower temperature limit.

In further features, the temperature sensor diagnostic system further comprises a temperature output module. The temperature output module selects one of the first and second temperatures based on the diagnosis and outputs the selected one of the first and second temperatures. The temperature output module selects the first temperature when the fault is diagnosed. In other features, the temperature output module estimates a current temperature based on a temperature measured by a second temperature sensor when the fault is diagnosed and outputs the current temperature.

A system comprises the temperature sensor diagnostic system, the temperature sensor, and an engine control module. The engine control module adjusts an engine parameter based on the selected one of the first and second temperatures. In other features, the upper and lower temperature limits are determined further based on a maximum temperature of the temperature sensor and a minimum temperature of the temperature sensor, respectively, wherein the maximum temperature is greater than the minimum temperature.

In still other features, the temperature sensor diagnostic system further comprises a previous temperature module that updates the previous temperature based on the second temperature when the fault is not diagnosed.

In further features, the temperature sensor is a first-order temperature sensor. In still further features, the temperature sensor is one of a coolant temperature sensor, an intake air temperature sensor, an oil temperature sensor, a transmission oil temperature sensor, and an ambient air temperature sensor.

A method comprises calculating a deviation coefficient based on a time constant of a temperature sensor and a period between first and second temperatures measured by the temperature sensor, wherein the second temperature is measured after the first temperature, determining upper and lower temperature limits based on the first temperature and the deviation coefficient, and selectively diagnosing a fault in the temperature sensor when the second temperature is one of greater than the upper temperature limit and less than the lower temperature limit.

In further features, the method further comprises selecting one of the first and second temperatures based on the diagnosis and outputting the selected one of the first and second temperatures. In other features, the first temperature is selected when the fault is diagnosed. In further features, the method further comprises estimating a current temperature based on a temperature measured by a second temperature sensor when the fault is diagnosed and outputting the current temperature. The method further comprises adjusting an engine parameter based on the selected one of the first and second temperatures.

In other features, the upper and lower temperature limits are determined further based on a maximum temperature of the temperature sensor and a minimum temperature of the temperature sensor, respectively, wherein the maximum temperature is greater than the minimum temperature. In still other features, the method further comprises updating the previous temperature based on the second temperature when the fault is not diagnosed.

In further features, the temperature sensor is a first-order temperature sensor. In still further features, the temperature sensor is one of a coolant temperature sensor, an intake air temperature sensor, an oil temperature sensor, a transmission oil temperature sensor, and an ambient air temperature sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller controls torque output by the engine based on a temperature provided by a temperature sensor. Controlling the engine based on a temperature provided during a temperature sensor fault, however, may cause an unexpected increase or decrease in torque production and/or an increase in emissions.

Generally, a temperature sensor fault occurs when the temperature sensor provides a temperature that is outside of an operating range of temperatures. A fault may occur, however, even when the temperature sensor provides a temperature that is within the operating range. For example, a fault may occur when a change between first and second temperatures provided by the temperature sensor is more than the change that the temperature sensor is capable of measuring.

Figure 2:
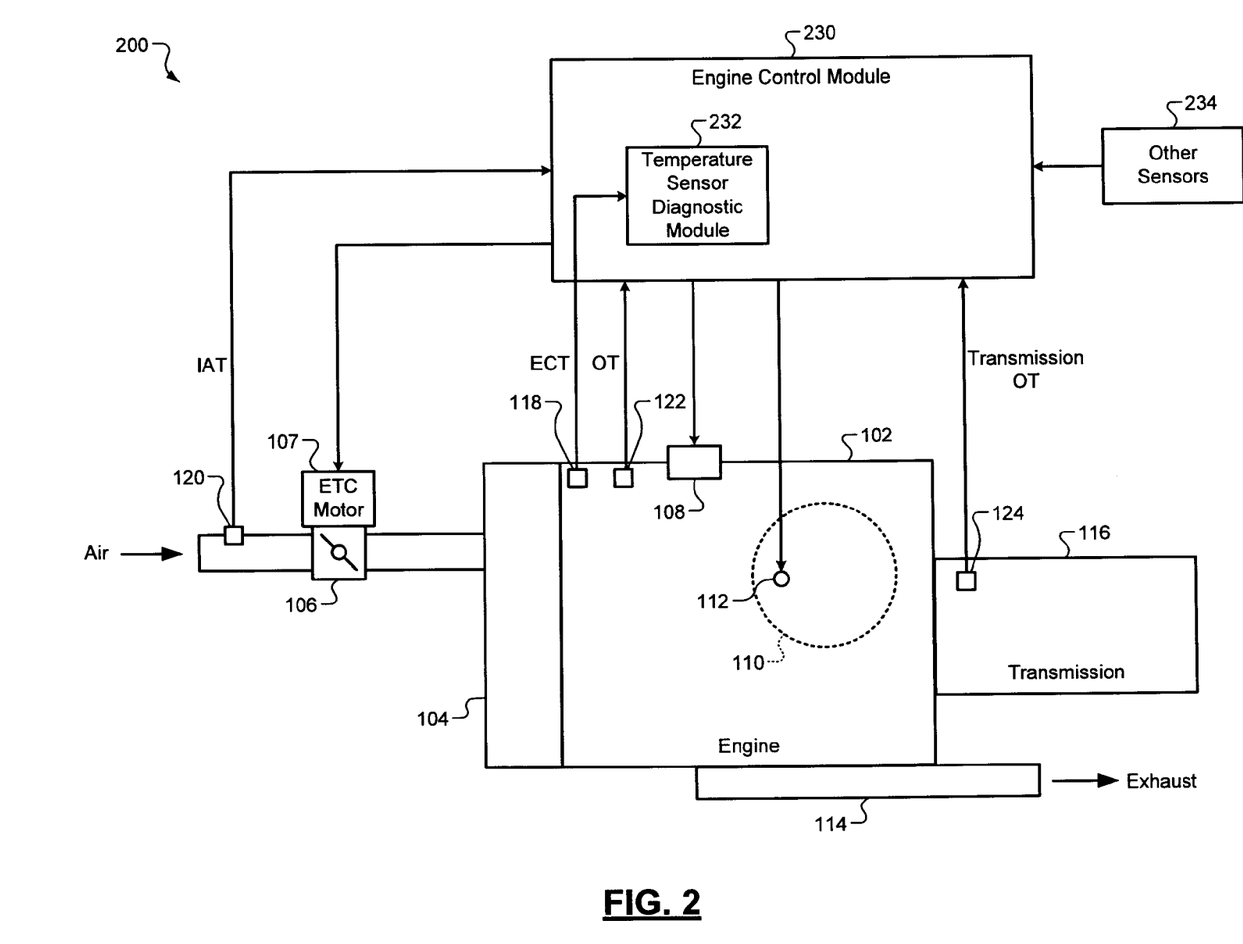
FIG. 2 is a functional block diagram of an exemplary engine system according to the principles of the present disclosure.

Referring now to FIG. 2, a functional block diagram of an exemplary engine system 200 is presented. The engine system 200 includes the engine 102 that combusts an air/fuel mixture to produce drive torque for a vehicle. Air is drawn into the intake manifold 104 through the throttle valve 106. The intake air temperature (IAT) sensor 120 measures the temperature of the air drawn into the intake manifold 104.

An engine control module (ECM) 230 controls opening of the throttle valve 106 via the electronic throttle control (ETC) motor 107, thereby controlling the amount of air drawn into the intake manifold 104 and the engine 102. Air from the intake manifold 104 is drawn into cylinders of the engine 102. While the engine 102 may include multiple cylinders, for illustration purposes, only the representative cylinder 110 is shown. For example only, the engine 102 may include 2, 3, 4, 5, 6, 8, 10, and/or 12 cylinders.

The ECM 230 also controls the amount of fuel injected by the fuel injector 108. The fuel injector 108 may inject fuel into the intake manifold 104 at a central location or may inject fuel into the intake manifold 104 at multiple locations, such as near the intake valve of each of the cylinders. Alternatively, the fuel injector 108 may inject fuel directly into the cylinders. In various implementations, one fuel injector is provided for each cylinder.

The injected fuel mixes with the air and creates the air/fuel mixture. A piston (not shown) compresses the air/fuel mixture within the cylinder 110. The spark plug 112 is energized based on a signal from the ECM 230, thereby igniting the air/fuel mixture. Although the engine 102 is depicted as including the spark plug 112, the engine 102 may be any suitable type of engine, such as a compression combustion type engine or a hybrid type engine and may not include the spark plug 112.

Combustion of the air/fuel mixture drives the piston down, rotatably driving a crankshaft (not shown), thereby producing torque. The engine 102 may transfer torque to the transmission 116 via the crankshaft. The transmission 116 may then transfer torque to one or more wheels of the vehicle. The byproducts of combustion (i.e., exhaust) are expelled from the cylinder 110 into the exhaust system 114.

The ECM 230 may regulate the torque output of the engine 102 based on temperature signals provided by one or more temperature sensors. For example only, the temperature sensors may include the engine coolant temperature (ECT) sensor 118, the oil temperature (OT) sensor 122, the transmission oil temperature sensor 124, the IAT sensor 120, and/or the ambient air temperature sensor (not shown).

The ECM 230 may also regulate the torque output of the engine 102 based on signals from other sensors 234, such as a manifold absolute pressure (MAP) sensor, a mass air flow (MAF) sensor, and/or a throttle position sensor (TPS). In various implementations, the ECM 230 may adjust the torque output of the engine 102 by adjusting one or more engine parameters, such as opening of the throttle valve 106, injection of fuel by the fuel injector 108, and/or spark timing.

For ease of explanation only, the principles of the present application will be discussed as they relate to the ECT sensor 118. However, the principles of the present application are equally applicable to any first-order temperature sensor, such as the IAT sensor 120, the OT sensor 122, the transmission oil temperature sensor 124, and/or the ambient air temperature sensor. The ECT sensor 118 measures the temperature of engine coolant. Although the ECT sensor 118 is depicted as within the engine 102, the ECT sensor 118 may be located anywhere that the engine coolant is circulated, such as within a radiator (not shown).

The ECT sensor 118 generates the ECT signal, which may be digitized by an analog-to-digital converter (ADC). Accordingly, the ECT signal may include digital values that each correspond to an engine coolant temperature (ECT). In various implementations, the digital values may be provided at a predetermined rate, such as once every 100 ms. Although the ECT signal will be discussed below as a digital signal, the ECT signal may be an analog signal.

Generally, the ECT sensor 118 provides an ECT that is within a predetermined temperature range. This range of temperatures may be referred to as the operating range of the ECT sensor 118. The operating range of the ECT sensor 118 is defined by an upper out-of-range (OOR) threshold and a lower OOR threshold. For example only, for the ECT sensor 118, the upper OOR threshold may be 200.0° C., and the lower OOR threshold may be −60.0° C. The operating range for the ECT sensor 118 may therefore include temperatures between −60.0° C. and 200.0° C.

The ECM 230 diagnoses faults in the ECT sensor 118 based on a comparison of the ECT with both the lower OOR threshold and the upper OOR threshold. More specifically, the ECM 230 may diagnose fault when the ECT is less than or equal to the lower OOR threshold and when the ECT is greater than or equal to the upper OOR threshold. A fault may occur, however, even when the ECT is within the operating range.

The change in ECT that the ECT sensor 118 is capable of measuring may be limited over a predetermined period of time. This limitation may be imposed by, for example, the time constant of the ECT sensor 118. The time constant corresponds to a time after measuring a first ECT at which the ECT sensor 118 may be able to measure a second ECT. For example only, the time constant for the ECT sensor may be 20.0 s.

The ECM 230 includes a temperature sensor diagnostic module 232 that selectively diagnoses fault in the ECT sensor 118. More specifically, the temperature sensor diagnostic module 232 diagnoses a fault in the ECT sensor 118 based on a comparison of an ECT with an upper temperature limit and a lower temperature limit. This ECT will be referred to as a current ECT.

The temperature sensor diagnostic module 232 determines the upper temperature limit and the lower temperature limit based on the upper OOR threshold and the lower OOR threshold, respectively, and a previous ECT. For example only, the previous ECT may be an ECT that was measured at a time when a fault did not occur. In various implementations, the previous ECT is the ECT measured at the most recent time at which a fault did not occur.

The temperature sensor diagnostic module 232 also determines the upper and lower temperature limits based on a deviation coefficient, which may be referred to as alpha. In various implementations, alpha corresponds to the change in ECT that the ECT sensor 118 is capable of measuring over the period of time between the previous ECT and the current ECT if the ECT sensor 118 is operating properly. For example only, alpha may be a value between 0.0 and 1.0.

The temperature sensor diagnostic module 232 determines alpha based on the time constant of the ECT sensor 118 and the period of time between the previous ECT and the current ECT. In various implementations, alpha increases as the period between the previous ECT and the current ECT increases. For example only, the time constant may be a predetermined value, such as 20.0 s.

As stated above, the temperature sensor diagnostic module 232 diagnoses fault in the ECT sensor 118 based on a comparison of the current ECT with the upper temperature limit and the lower temperature limit. For example only, the temperature sensor diagnostic module 232 may diagnose fault in the ECT sensor 118 when the current ECT is greater than the upper temperature limit or when the current ECT is less than the lower temperature limit.

The temperature sensor diagnostic module 232 selects one of the current ECT and the previous ECT based on whether a fault has occurred. The temperature sensor diagnostic module 232 outputs the selected ECT to the ECM 230. For example only, the temperature sensor diagnostic module 232 may output the current ECT when a fault has not occurred. The temperature sensor diagnostic module 232 may output the previous ECT when a fault has occurred.

After the occurrence of a fault, the temperature sensor diagnostic module 232 may continue to output the previous ECT until the next time that the temperature sensor diagnostic module 232 determines that a fault has not occurred. Then, the temperature sensor diagnostic module 232 may output the current ECT. Additionally, the temperature sensor diagnostic module 232 sets the previous ECT equal to the current ECT when fault has not occurred in the ECT sensor 118. In this manner, the temperature sensor diagnostic module 232 will use the current ECT (as the previous ECT) in determining future upper and lower temperature limits that can be used to diagnose future faults.

In other implementations, when fault has occurred, the temperature sensor diagnostic module 232 may estimate the current ECT and output the estimated ECT. For example only, the temperature sensor diagnostic module 232 may estimate the current ECT based on a temperature provided by another temperature sensor, such as the ambient air temperature sensor and/or the IAT sensor 120.

In various implementations, the temperature sensor diagnostic module 232 may also limit the rate at which the output ECT changes from the previous ECT to the current ECT after a fault has occurred. This may be done to prevent a large change in ECT that may be present between the previous ECT and the current ECT after the occurrence of a fault. Such a change may cause the ECT 230 to suddenly increase or decrease the torque production of the engine 102.

The ECM 230 receives the output ECT from the temperature sensor diagnostic module 232 and adjusts one or more engine parameters based on the output ECT. In this manner, the ECM 230 regulates torque output of the engine 102 based on the output ECT. Although the temperature sensor diagnostic module 232 is depicted as being within the ECM 230, the temperature sensor diagnostic module 232 may be external to the ECM 230.

Figure 3:
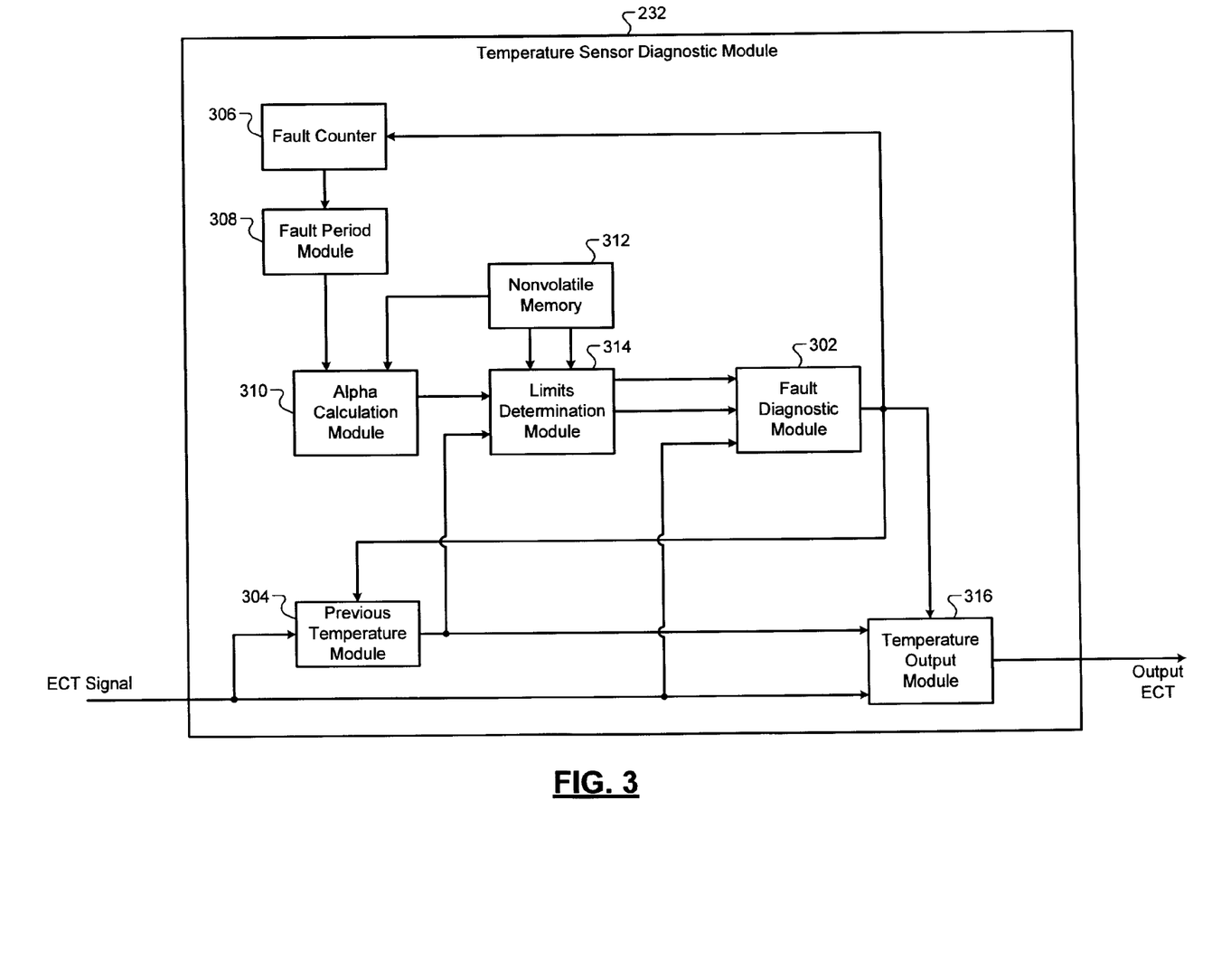
FIG. 3 is a functional block diagram of an exemplary temperature sensor diagnostic module according to the principles of the present disclosure.

Referring now to FIG. 3, a functional block diagram of an exemplary implementation of the temperature sensor diagnostic module 232 is presented. The temperature sensor diagnostic module 232 includes a fault diagnostic module 302 that selectively diagnoses fault in the ECT sensor 118. More specifically, the fault diagnostic module 302 diagnoses fault in the ECT sensor 118 based on a comparison of the current ECT with the upper temperature limit and the lower temperature limit. The fault diagnostic module 302 generates a fault signal based on the comparison, which indicates whether a fault has occurred in the ECT sensor 118. For example only, a fault may occur when the current ECT is greater than the upper temperature limit or when the current ECT is less than the lower temperature limit.

A previous temperature module 304 receives the ECT signal (i.e., the current ECT) from the ECT sensor 118 and the fault signal from the fault diagnostic module 302. The previous temperature module 304 outputs the previous ECT and sets the previous ECT equal to the current ECT when a fault has not occurred. In this manner, the previous temperature module 304 updates the previous ECT based on the current ECT when fault has not occurred.

The temperature sensor diagnostic module 232 also includes a fault counter 306 and a fault period module 308. The fault counter 306 also receives the fault signal and is incremented each time the fault signal indicates that a fault has occurred. Additionally, the fault counter 306 is reset when the fault signal indicates that a fault has not occurred. The fault counter 306 may be reset to a predetermined reset value, such as zero. In this manner, the fault counter 306 tracks the number of faults that have occurred since the previous ECT. In various implementations, after a predetermined number of faults have occurred, the fault counter 306 may also instruct the ECM 230 to illuminate a "check engine" light or to set a trouble code in memory.

The fault period module 308 determines the period between the previous ECT and the current ECT. This period may be referred to as the fault period. The fault period module 308 determines the fault period based on the number of faults indicated by the fault counter 306. The fault period may also be determined based on the period between the digital values of the ECT signal (e.g., 100 ms).

A deviation calculation module 310 calculates alpha (i.e., the deviation coefficient) based on the time constant of the ECT sensor 118. Alpha corresponds to the magnitude of change in ECT that the ECT sensor 118 is capable of measuring over the fault period when the ECT sensor 118 is operating properly. For example only, alpha may be a value between 0.0 and 1.0, and the deviation calculation module 310 may calculate alpha using the equation:

$$\text{alpha}=1-\exp(-(\text{fault period}+1)/TC), \quad (1)$$

where fault period is the period between the previous ECT and the current ECT, exp is the exponential function, and TC is the time constant of the ECT sensor 118. The time constant of the ECT sensor 118 may be, for example, stored in nonvolatile memory 312.

A limits determination module 314 determines the upper and lower temperature limits and provides the limits to the fault diagnostic module 302. The limits determination module 314 may determine the upper and lower temperature limits based on alpha and the previous ECT. Additionally, the upper and lower temperature limits may be determined based on the upper OOR threshold and the lower OOR threshold, respectively. For example only, the upper temperature limit and the lower temperature limit may be determined using the equations:

$$\text{Upper Temperature Limit}=\text{alpha}*\text{upper OOR}+(1-\text{alpha})*\text{Previous ECT}, \quad (2)$$

and $$\text{Lower Temperature Limit}=\text{alpha}*\text{lower OOR}+(1-\text{alpha})*\text{Previous ECT}, \quad (3)$$

where upper OOR is the upper OOR threshold and lower OOR is the lower OOR threshold. For example only, for the ECT sensor 118, the upper OOR threshold may be 200.0° C. and the lower OOR threshold may be −60.0° C.

A temperature output module 316 selects either the previous ECT or the current ECT based on the fault signal and outputs the selected ECT to the ECM 230. For example only, the temperature output module 316 may output the current ECT when fault has not occurred. The temperature output module 316 may output the previous ECT when a fault has occurred in the ECT sensor 118.

Figure 4:
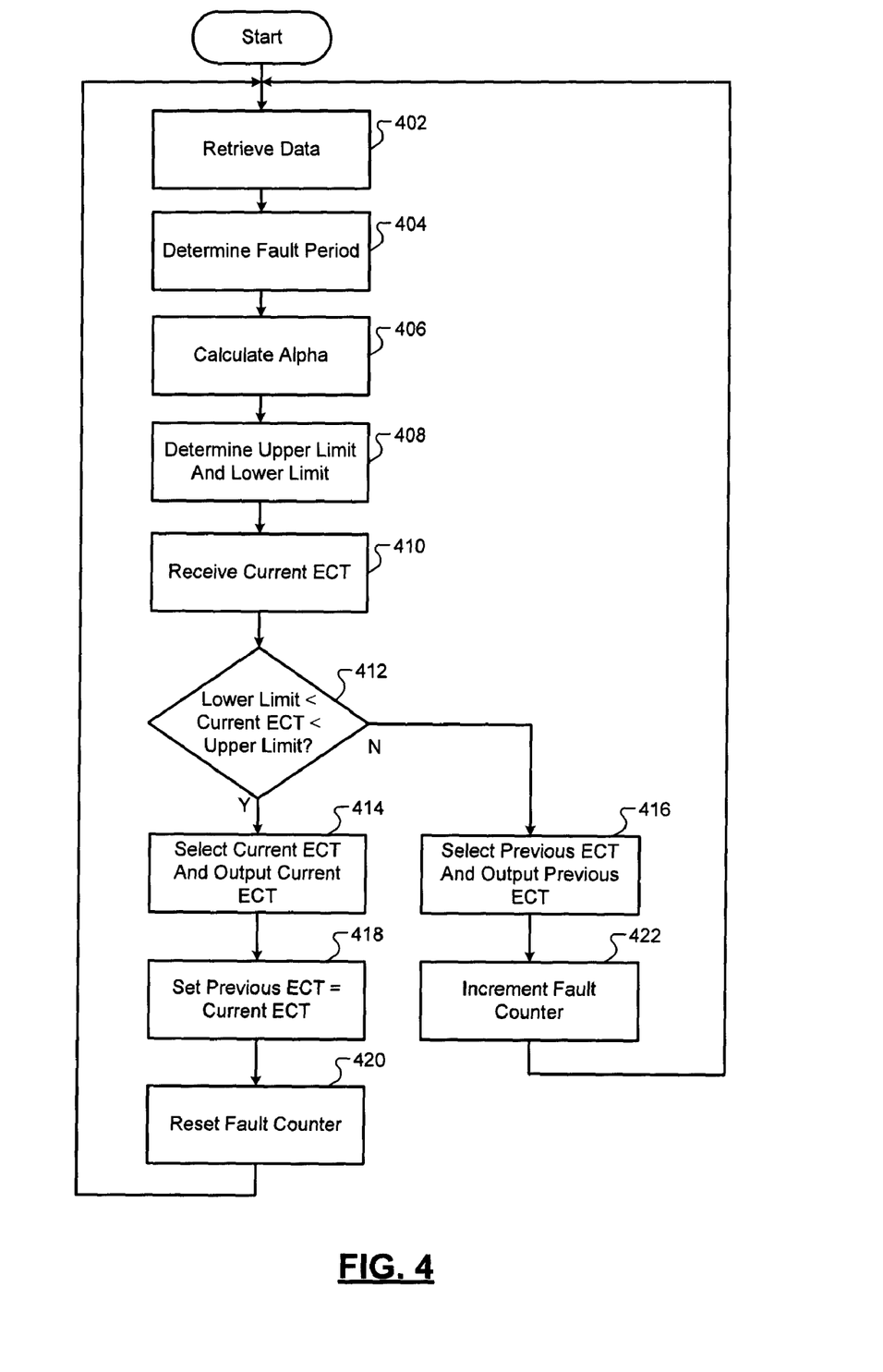
FIG. 4 is a flowchart depicting exemplary steps performed by the temperature sensor diagnostic module according to the principles of the present disclosure.

Referring now to FIG. 4, a flowchart depicting exemplary steps performed by the temperature sensor diagnostic module 232 is presented. Control begins in step 402 where control retrieves data. For example only, the data may include the upper OOR threshold, the lower OOR threshold, the time constant of the ECT sensor 118, and/or the number of faults. In various implementations, control may retrieve the upper and lower OOR thresholds and/or the time constant from the nonvolatile memory 312. Control may retrieve the number of faults from, for example, the fault counter 306.

Control continues in step 404 where control determines the fault period. In various implementations, control determines the fault period based on the number of faults and the period between the digital values of the ECT signal (e.g., 100 ms). In step 406, control calculates alpha (i.e., the deviation coefficient). For example only, control may calculate alpha using equation (1), as described above.

Control continues in step 408 where control determines the upper temperature limit and the lower temperature limit. For example only, control may determine the upper temperature limit and the lower temperature limit using equations (2) and (3), respectively, as described above. In step 410, control receives the ECT from the ECT sensor 118. The received ECT may be referred to as the current ECT.

Control then continues in step 412, where control compares the current ECT with the upper temperature limit and the lower temperature limit. If the current ECT is both greater than the lower temperature limit and less than the upper temperature limit, control continues in step 414; otherwise, control transfers to step 416. In step 414, control selects the current ECT and outputs the current ECT. In this manner, control outputs the current ECT when a fault has not occurred. Control then continues in step 418 where control sets the previous ECT equal to the current ECT. In step 420, control resets the fault counter (i.e., the number of faults), and control returns to step 402.

Referring back to step 412, control transfers from step 412 to step 416 when the current ECT is greater than the upper temperature limit or when the current ECT is less than the lower temperature limit. In step 416, control selects the previous ECT and outputs the previous ECT. In this manner, control outputs the previous ECT when a fault has occurred. Alternatively, control may estimate the current ECT and output the estimated ECT. For example only, control may estimate the current ECT based on a temperature provided by another temperature sensor, such as the IAT sensor 120 and/or the ambient air temperature sensor.

Control continues in step 422 where control increments the fault counter (i.e. the number of faults), and control returns to step 402. In this manner, the fault counter tracks the number of faults that have occurred between the previous ECT and the current ECT. As described above, the fault period is determined based on the number of faults. More specifically, incrementing the number of faults increases the fault period. The increased fault period can then be used in the next control cycle to determine the upper and lower temperature limits for a future ECT.

Figure 5:
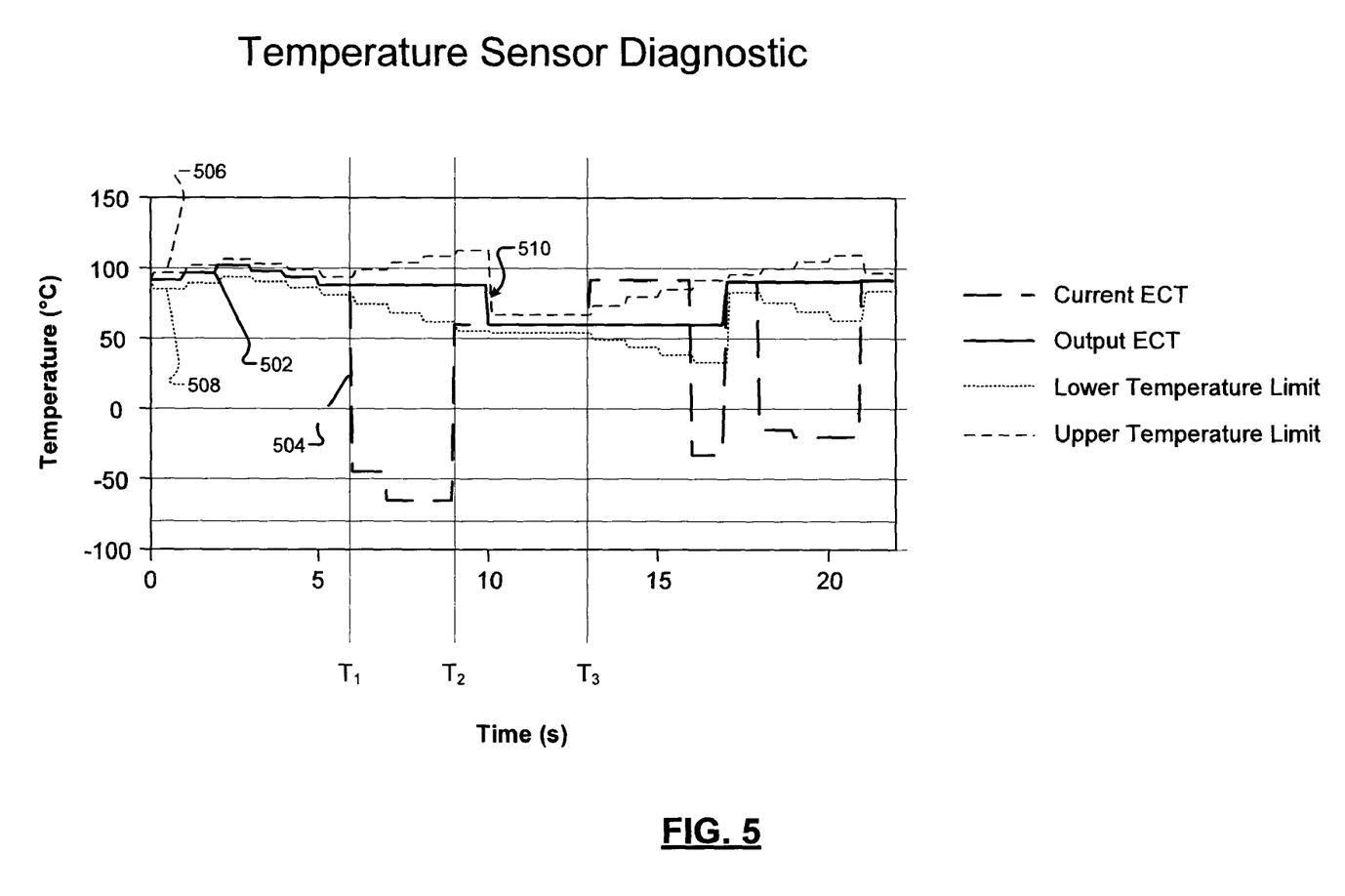
FIG. 5 is an exemplary graphical illustration of the operation of the temperature sensor diagnostic module according to the principles of the present disclosure.

Referring now to FIG. 5, an exemplary graphical illustration of operation of the temperature sensor diagnostic module 232 is presented. Line 502 corresponds to the ECT that is output by the temperature sensor diagnostic module 232. Dashed line 504 corresponds to the current ECT. Dashed lines 506 and 508 correspond to the upper temperature limit and the lower temperature limit, respectively.

The temperature sensor diagnostic module 232 may determine the upper temperature limit and lower temperature limit based on the alpha and the previous ECT. Additionally, the upper and lower temperature limits may be determined based on the upper OOR threshold and the lower OOR threshold, respectively. For example only, the temperature sensor diagnostic module 232 may determine alpha, the upper temperature limit, and the lower temperature limit using equations, (1), (2), and (3), respectively, as described above.

Prior to time $T_1$, the current ECT is both greater than the lower temperature limit (dashed line 508) and less than the upper temperature limit (dashed line 506). Accordingly, the temperature sensor diagnostic module 232 indicates that fault has not occurred in the ECT sensor 118 and outputs (line 502) the current ECT. Additionally, the temperature sensor diagnostic module 232 sets the previous ECT equal to the current ECT each time that fault has not occurred.

At time $T_1$, however, the current ECT (dashed line 504) becomes less than the lower temperature limit (dashed line 508). Accordingly, the temperature sensor diagnostic module 232 diagnoses fault in the ECT sensor 118 and outputs the previous ECT. For example only, the previous ECT may be the ECT before time $T_1$ when fault had not occurred.

Between times $T_1$ and $T_2$, the current ECT remains less than the lower temperature limit. Accordingly, the fault period increases as time passes after $T_1$. As the fault period increases, alpha increases. The temperature sensor diagnostic module 232 determines the upper and lower temperature limits based on this increased alpha. In this manner, as time passes between times $T_1$ and $T_2$, the upper temperature limit increases and the lower temperature limit decreases. The upper and lower temperature limits may therefore correspond to the maximum and minimum ECT that the ECT sensor 118 could measure if the ECT sensor 118 is operating properly.

At time $T_2$, the current ECT once again becomes both greater than the lower temperature limit (dashed line 508) and less than the upper temperature limit (dashed line 506). Accordingly, the temperature sensor diagnostic module 232 indicates that a fault has not occurred and outputs the current ECT. However, as shown at reference numeral 510, the temperature sensor diagnostic module 232 may limit the rate at which the output ECT changes to the current ECT.

Between time $T_2$ and $T_3$, the current ECT remains both greater than the lower temperature limit and less than the upper temperature limit. Accordingly, the temperature sensor diagnostic module 232 outputs the current ECT until time $T_3$. At time $T_3$, the current ECT (dashed line 504) becomes greater than the upper temperature limit (dashed line 506).

The temperature sensor diagnostic module 232 then diagnoses that a fault has occurred in the ECT sensor 118 and outputs the previous ECT (e.g., the ECT before time $T_3$). The temperature sensor diagnostic module 232 then proceeds as described above, increasing the fault period and adjusting the upper and lower temperature limits. Additionally, if the fault period exceeds a predetermined period, the temperature sensor diagnostic module 232 may, for example, illuminate a "check engine" light.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A temperature sensor diagnostic system for a vehicle, comprising:
  a deviation calculation module that calculates a deviation coefficient based on a time constant of a temperature sensor and a period between first and second temperatures measured by said temperature sensor, wherein said second temperature is measured after said first temperature;
  a limits determination module that determines upper and lower temperature limits based on said first temperature and said deviation coefficient; and
  a fault diagnostic module that selectively diagnoses a fault in said temperature sensor when said second temperature is one of greater than said upper temperature limit and less than said lower temperature limit.

2. The temperature sensor diagnostic system of claim 1 further comprising a temperature output module that selects one of said first and second temperatures based on said diagnosis and that outputs said selected one of said first and second temperatures.

3. The temperature sensor diagnostic system of claim 2 wherein said temperature output module selects said first temperature when said fault is diagnosed.

4. The temperature sensor diagnostic system of claim 2 wherein said temperature output module estimates a current temperature based on a temperature measured by a second temperature sensor when said fault is diagnosed and outputs said current temperature.

5. A system comprising:
  the temperature sensor diagnostic system of claim 2;
  the temperature sensor; and
  an engine control module that adjusts an engine parameter based on said selected one of said first and second temperatures.

6. The temperature sensor diagnostic system of claim 1 wherein said upper and lower temperature limits are determined further based on a maximum temperature of said temperature sensor and a minimum temperature of said temperature sensor, respectively,
  wherein said maximum temperature is greater than said minimum temperature.

7. The temperature sensor diagnostic system of claim 1 further comprising a previous temperature module that updates said first temperature based on said second temperature when said fault is not diagnosed.

8. The temperature sensor diagnostic system of claim 1 wherein said temperature sensor is a first-order temperature sensor.

9. The temperature sensor diagnostic system of claim 8 wherein said temperature sensor is one of a coolant temperature sensor, an intake air temperature sensor, an oil temperature sensor, a transmission oil temperature sensor, and an ambient air temperature sensor.

10. A method comprising:
  calculating a deviation coefficient based on a time constant of a temperature sensor and a period between first and second temperatures measured by said temperature sensor, wherein said second temperature is measured after said first temperature;
  determining upper and lower temperature limits based on said first temperature and said deviation coefficient; and
  selectively diagnosing a fault in said temperature sensor when said second temperature is one of greater than said upper temperature limit and less than said lower temperature limit.

11. The method of claim 10 further comprising:
  selecting one of said first and second temperatures based on said diagnosis; and
  outputting said selected one of said first and second temperatures.

12. The method of claim 11 wherein said first temperature is selected when said fault is diagnosed.

13. The method of claim 11 further comprising:
  estimating a current temperature based on a temperature measured by a second temperature sensor when said fault is diagnosed; and
  outputting said current temperature.

14. The method of claim 11 further comprising adjusting an engine parameter based on said selected one of said first and second temperatures.

15. The method of claim 10 wherein said upper and lower temperature limits are determined further based on a maximum temperature of said temperature sensor and a minimum temperature of said temperature sensor, respectively, wherein said maximum temperature is greater than said minimum temperature.

16. The method of claim 10 further comprising updating said first temperature based on said second temperature when said fault is not diagnosed.

17. The method of claim 10 wherein said temperature sensor is a first-order temperature sensor.

18. The method of claim 17 wherein said temperature sensor is one of a coolant temperature sensor, an intake air temperature sensor, an oil temperature sensor, a transmission oil temperature sensor, and an ambient air temperature sensor.

* * * * *